July 6, 1954
H. T. KRAFT
2,682,684
SECTIONAL KNOCKDOWN SUPPORTING RIM
FOR RETREAD VULCANIZER AIR BAGS
Filed March 6, 1953
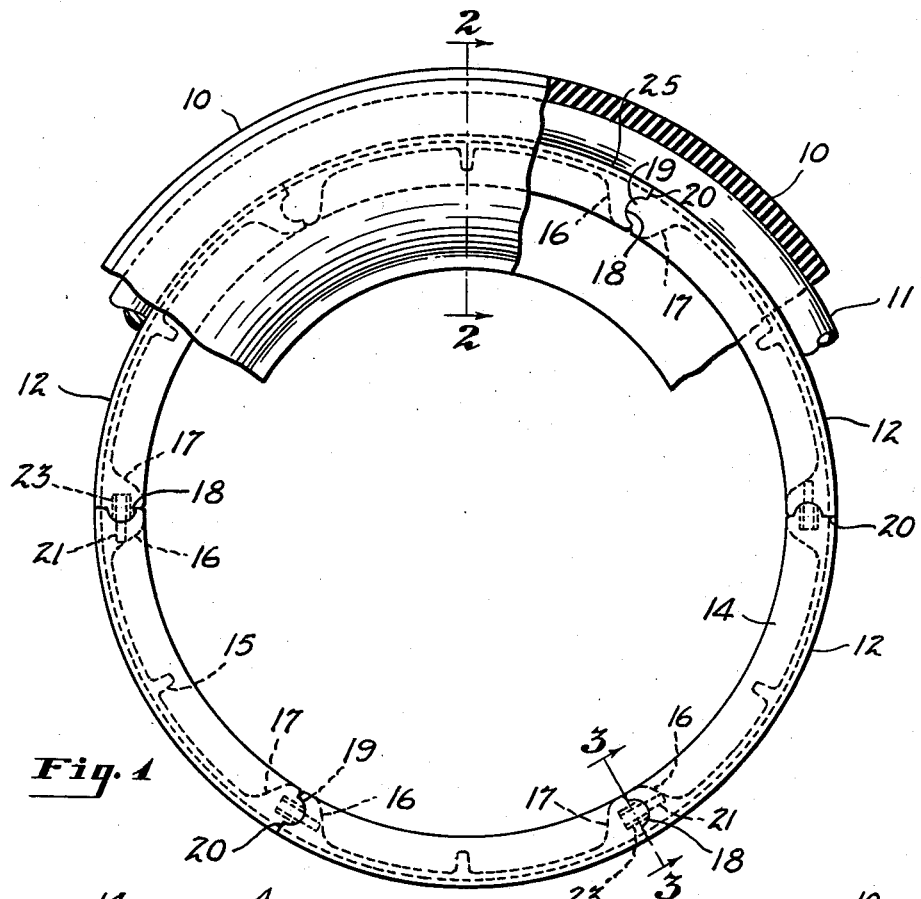
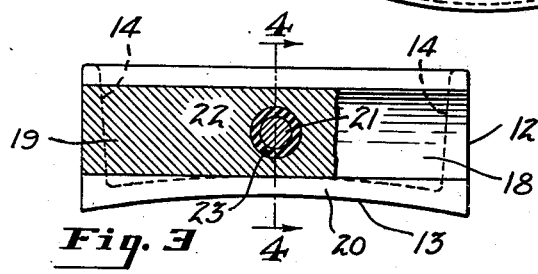
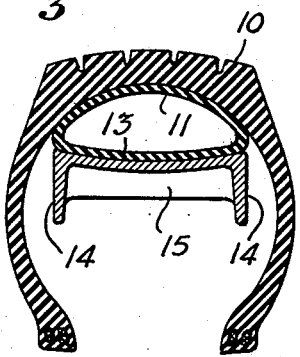
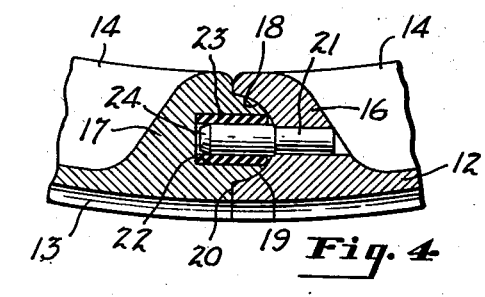
INVENTOR
Herman T. Kraft
BY Evans + McCoy
ATTORNEYS Patented July 6, 1954

2,682,684

UNITED STATES PATENT OFFICE 2,682,684

SECTIONAL KNOCKDOWN SUPPORTING RIM FOR RETREAD VULCANIZER AIR BAGS

Herman T. Kraft, Akron, Ohio, assignor to The General Tire and Rubber Company, Akron, Ohio, a corporation of Ohio Application March 6, 1953, Serial No. 340,787

5 Claims. (Cl. 18—18)

This invention relates to a sectional knockdown rim for supporting a vulcanizing air bag within a tire casing while a retread is being vulcanized thereon and particularly to air bag supporting rims for use in the retreading of large diameter tire casings.

The rim of the present invention is composed of a series of detachably connected sections preferably in the form of identical castings which can be readily joined together within a tire casing into which the air bag has previously been inserted. To enable the rim to provide a rigid backing for an air bag inflated to a high pressure, the end faces of the rim sections are radially disposed inwardly of and adjacent the periphery of the rim so that the rim sections when assembled provide a circumferentially continuous air bag engaging surface and are wedged rigidly together by the radially applied pressure when the air bag is inflated.

The abutting end faces of the rim sections have interfitting projections and recesses that are preferably rounded to provide bearing surfaces upon which the sections may have a limited rocking movement to facilitate assembly and disassembly of the rim sections. The projections and recesses preferably extend across the end faces of the sections so as to permit relative pivotal movement between the sections in the plane of the rim only.

To hold the rim sections together during assembly, all except two of the joints are provided with a dowel lock, the lock being omitted at the ends of one of the sections which serves as a key section that can be put in place when the spaced ends of the previously joined sections are spread apart against the interior of an uninflated air bag and which can be removed in a similar manner. Each dowel pin is carried by one section at the end thereof and projects into a socket formed in the abutting end of the adjoining section, the socket being provided with a cushioned peripheral wall which permits a small amount of lateral movement of the pin in the socket, which is sufficient to permit the rim to be sprung outwardly after all the sections except the key section have been assembled enough to permit insertion of the key section.

The invention has for its object to provide a rim for large diameter air bags which can be readily assembled piece by piece against the inner periphery of an uninflated air bag inside a tire casing, which provides a rigid backing for the inflated air bag during the vulcanizing operation, and which can be quickly and easily taken apart after the vulcanizing operation is completed.

Reference should be had to the accompanying drawings forming a part of this specification in which:

Figure 1 shows the knockdown rim of the present invention in side elevation, showing also a fragmentary portion of the tire casing and air bag with which the rim is assembled prior to a retread vulcanizing operation;

Fig. 2 is a transverse section through the tire casing, air bag and rim taken on the line indicated at 2—2 in Fig. 1;

Fig. 3 is a transverse section through the rim taken on the line indicated at 3—3 in Fig. 1; and Fig. 4 is a fragmentary section through one of the joints taken in the median plane of the rim as indicated at 4—4 in Fig. 3.

In the accompanying drawings the air bag supporting rim of the present invention is shown in connection with a tire casing 10 and an air bag 11, the rim being of an external diameter considerably greater than the bead diameter of the tire casing and providing a support for the air bag 11 which is positioned within the tread portion of the tire casing. The rim of the present invention is designed particularly for use with air bags in tire casings of large diameter and is composed of sections 12 that are preferably in the form of identical castings and which can be assembled piece by piece against the interior of an air bag within the tire casing, the individual sections of the rim being of a size and weight for convenient handling in the assembling operation.

Each of the sections 12 has a transversely concave longitudinally convex outer face 13 which forms a segment of the circular periphery of the rim. The sections are each provided with inwardly projecting side flanges 14 and may be additionally reinforced by means of transverse ribs 15. Each of the sections is provided at its opposite ends with thick end flanges 16 and 17 which project inwardly and which may be of the same height as the flanges 14. Each of the flanges 16 is provided with a concave recess 18 which extends transversely across the end face from one side of the section to the other and the rib 17 is provided with a convex projection 19 that fits in the recess 18 of the adjoining section. The recesses 18 and projections 19 are spaced inwardly from the outer face 13 and between the rim periphery and the recesses and projections the sections have face portions 20 that are radially disposed and that are held in tight wedging engagement by the externally applied radial pressure exerted on the rim by the air bag when it is inflated.

In order to hold the sections together in proper alinement during assembly, all joints except two are provided with a locking means comprising dowel pins 21 that are attached to the flanges 16 centrally thereof and sockets 22 that are formed in the flanges 17 and into which the pins 21 extend. In order to permit slight relative rocking movements of the sections to facilitate assembly and disassembly, the sockets 22 are made of a diameter larger than the pins 21 and cushioning means is provided between the peripheral wall of the socket and the dowel pin, the cushioning means being preferably in the form of a sleeve 23 of elastic rubber within which the dowel pin 21 fits. To facilitate the entry of the dowel pins into the sleeves 23, the pins may be provided with tapered ends 24.

One of the sections 25 serves as a key section and the dowel lock is omitted at the ends of this section. In assembling the ring against the interior of an air bag within a tire casing, the sections are assembled one at a time within the tire casing and in engagement with the air bag, the assembled sections being held in alinement by means of the projections 19 in the recesses 18 and by the dowel pins 21. When all of the sections except the key section 25 have been joined together, the ends of the partially formed rim are spread apart to expand the rim slightly against the interior of the uninflated air bag, the dowel pins 21 being movable against the elastic wall of the rubber sleeve 23 sufficiently to permit the sections to rock slightly about their abutting outer edges sufficiently to permit insertion of the key section 25.

After the vulcanizing operation the air bag is deflated and the rim sections at the opposite ends of the key section 25 are spread apart to permit removal of the section 25, after which the other sections can be readily taken apart.

It is to be understood that in accordance with the provisions of the patent statutes, variations and modifications of the specific devices herein shown and described may be made without departing from the spirit of the invention.

What I claim is:

1. An annular knockdown supporting rim for a retread vulcanizer air bag composed of a series of arcuate sections detachably connected by joints at the ends of the sections that resist the collapse of the rim under externally applied radial pressure, each joint comprising end faces of said sections that abut across the periphery of the rim and that are disposed substantially radially, certain of the joints having a locking connection comprising a dowel pin attached to one section and projecting past its end face and a socket in the abutting end face that receives said pin, the peripheral wall of each socket having a yieldable liner that engages said pin and that will permit a limited rocking of the abutting sections about the outer edges of the abutting faces, the dowel pins being omitted in the joints at the ends of one section to facilitate the insertion and removal of the latter section in assembling and disassembling the rim.

2. A collapsible annular supporting rim for a retread vulcanizer air bag composed of a series of arcuate sections with joints at the ends of the sections that resist collapse of the rim under externally applied radial pressure, each joint comprising end faces of said sections that are substantially radial and that abut across the periphery of the rim, one end face having a concave recess and the other an integral convex projection that engages in the recess, certain of the points having a locking connection comprising a dowel pin attached to one section and projecting past the end face thereof, and a socket in the abutting end face that receives said pin, said socket having a tubular elastic rubber liner in which said pin fits, the dowel pins being omitted in the joints at the ends of one section to facilitate the insertion and removal of the latter section in assembling and disassembling the rim.

3. A collapsible annular supporting rim for a retread vulcanizer air bag composed of a series of arcuate sections with joints at the ends of the sections that resist collapse of the rim under externally applied radial pressure, each joint comprising end faces of said sections that abut across the periphery of the rim, one of the abutting end faces being provided with a concave recess extending across the same inwardly of the rim periphery and the other abutting face being provided with a convex projection that fits in said recess, certain of the joints having a locking connection comprising a socket in one abutting end face and a dowel pin attached to the section abutting the socketed face and projecting into said socket, each socket having an elastic rubber liner that receives the pin and that will permit a limited rocking of the abutting sections about the outer edges of the abutting faces, the dowel pins being omitted in the joints at the ends of one of said sections to facilitate its insertion or removal when the remainder of the ring is sprung outwardly.

4. A rim such as defined in claim 3 in which the dowel sockets are formed in the convex projections and the dowel pins are mounted in the recesses of the abutting sections.

5. A collapsible annular supporting rim for a retread vulcanizer air bag composed of a series of arcuate sections in the form of identical castings providing joints at the ends of the sections that resist the collapse of the rim under externally applied radial pressure, each joint comprising end faces of the sections that abut across the periphery of the rim, one of the abutting end faces being provided with a concave recess extending across the same inwardly of the rim periphery and the other abutting face having a convex projection coextensive with and fitting in said recess, certain of the joints having a locking connection comprising a dowel pin attached to one section and projecting past its end face and a socket in the abutting end face which receives said pin, said socket being larger than the pin and having a cushioning body of elastic rubber therein between the pin and the peripheral wall of the socket, the dowel pins being omitted in the joints at opposite ends of one section.

No references cited.